INVENTORS
FRANCIS J. FUCHS, Jr.
CHARLES L. SAUNDERS,
BY
A.C. Schwarz, Jr.
ATTORNEY

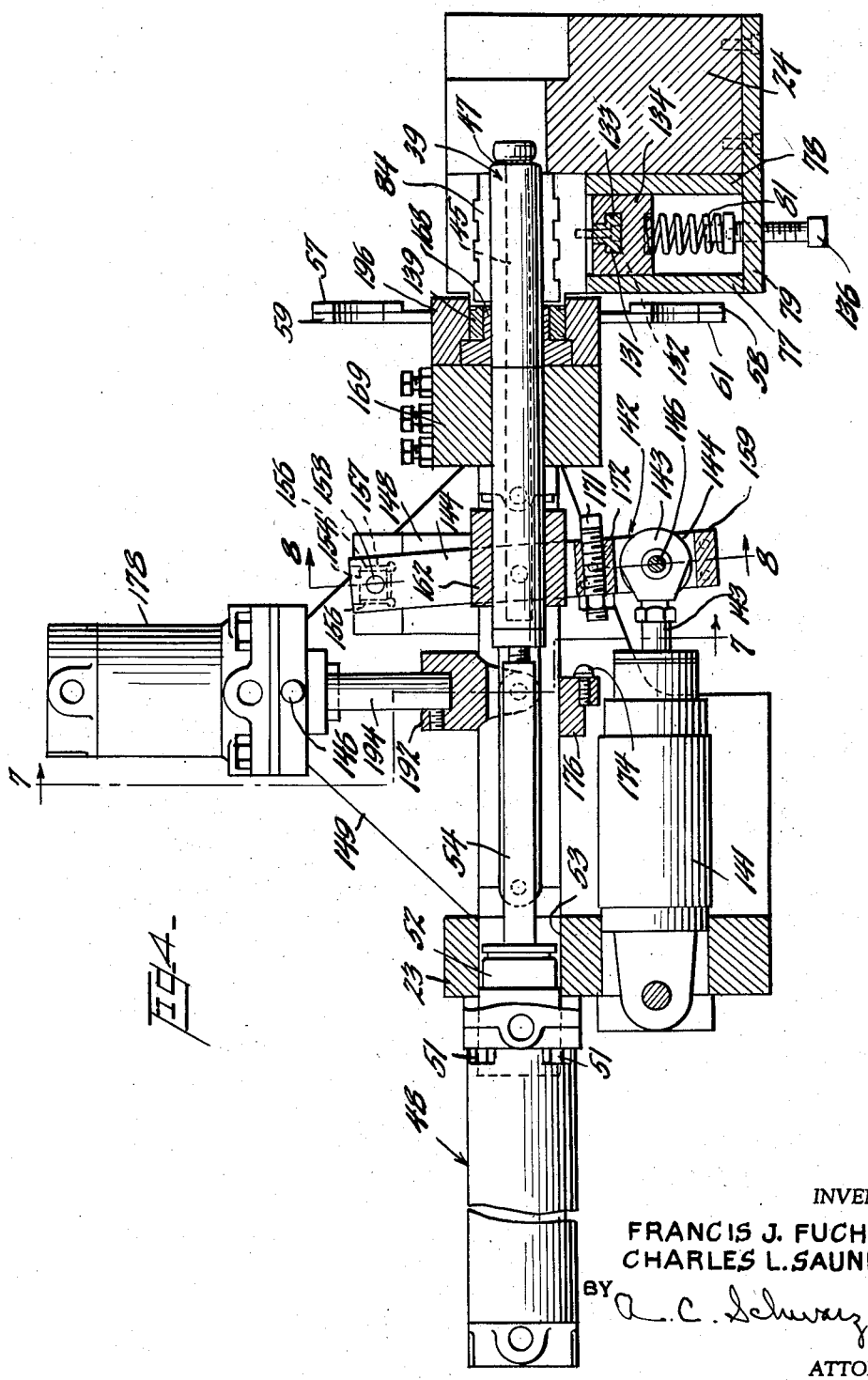

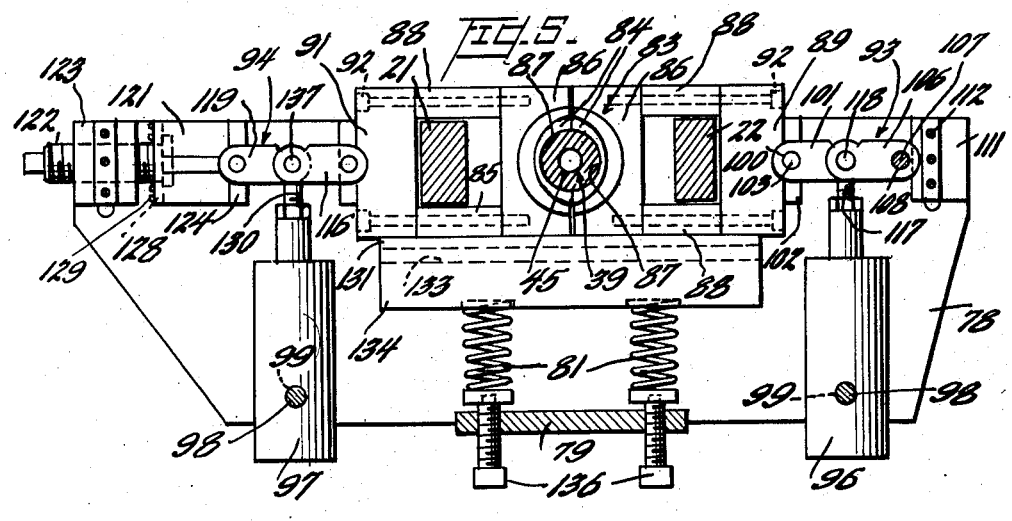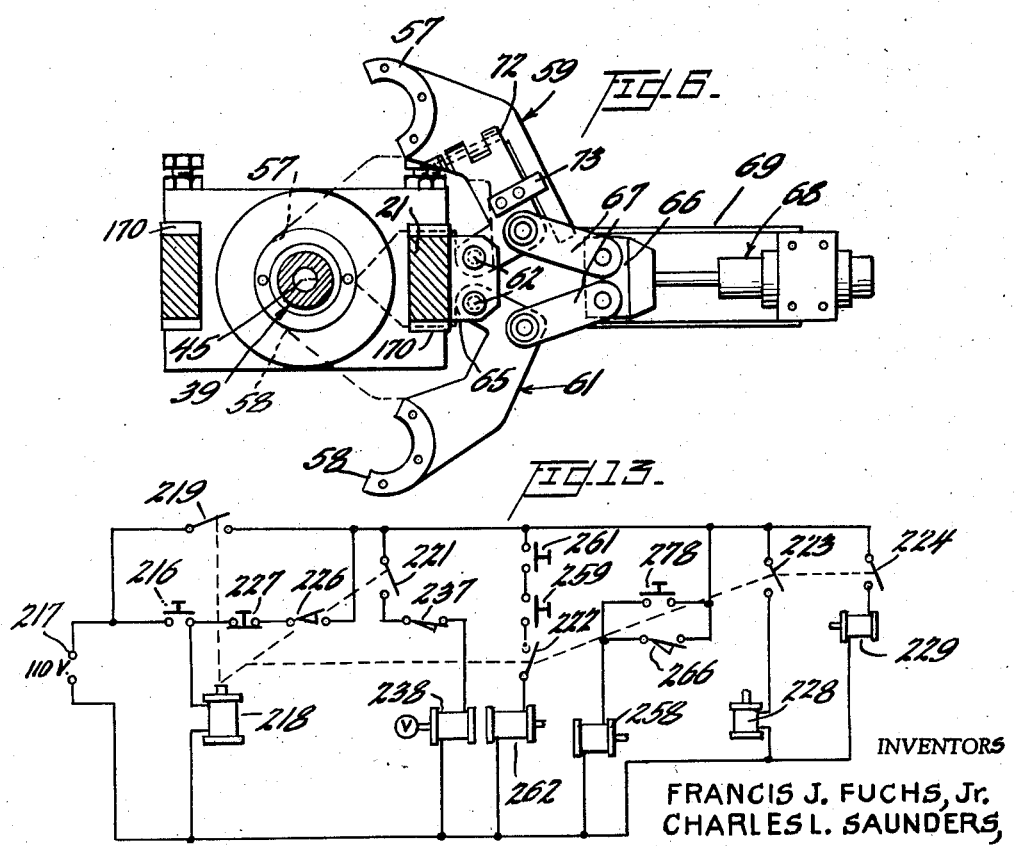

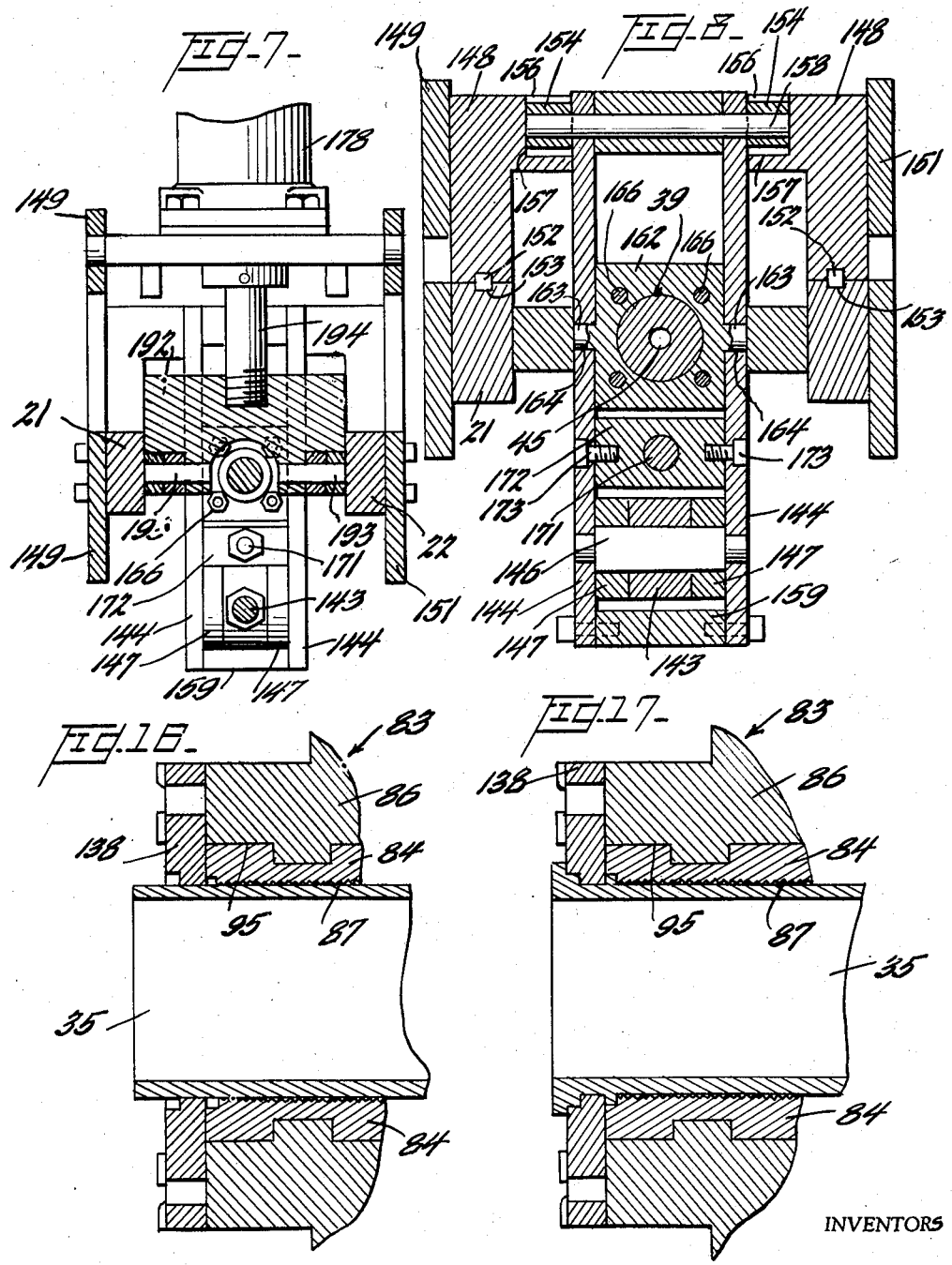

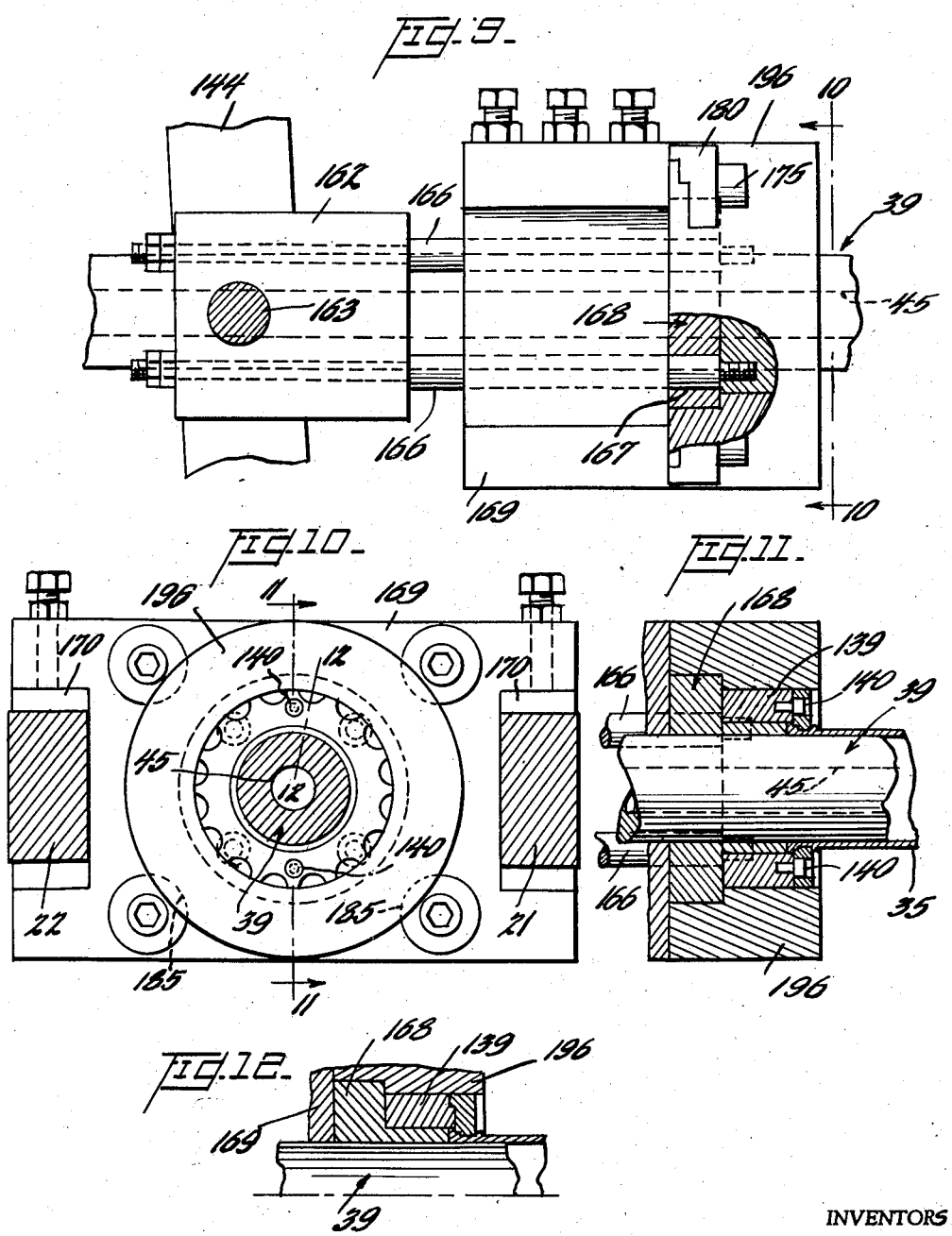

Feb. 3, 1959　　　F. J. FUCHS, JR., ET AL　　　2,871,734
APPARATUS FOR HEADING TUBULAR MEMBERS
Filed Feb. 29, 1956　　　　　　　　　　　　　　9 Sheets-Sheet 8

INVENTORS
FRANCIS J. FUCHS, Jr.
CHARLES L. SAUNDERS
BY A. C. Schwarz, Jr.
ATTORNEY

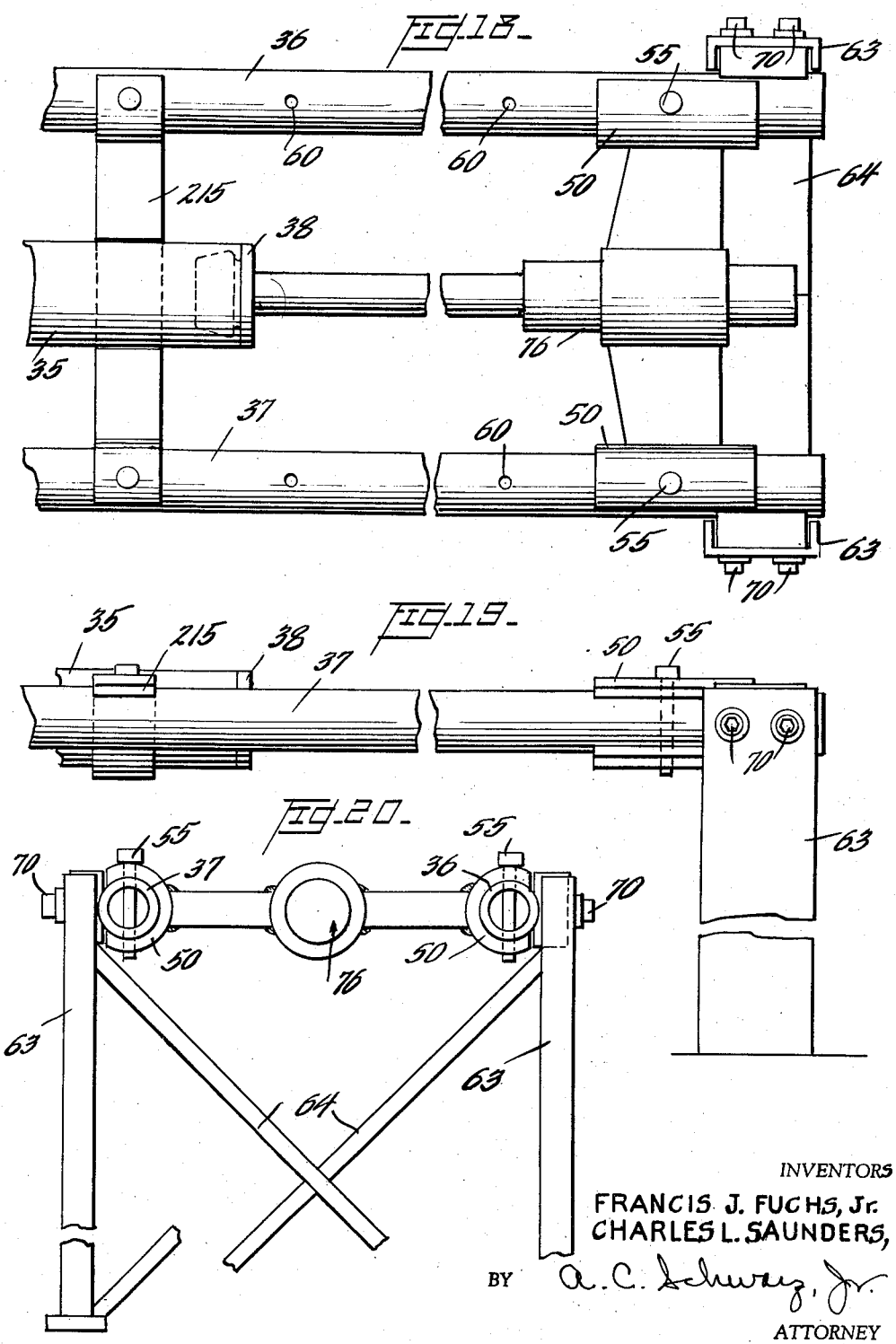

United States Patent Office 2,871,734
Patented Feb. 3, 1959

2,871,734

APPARATUS FOR HEADING TUBULAR MEMBERS

Francis J. Fuchs, Jr., and Charles L. Saunders, Winston-Salem, N. C., assignors to Western Electric Company, Incorporated, New York, N. Y., a corporation of New York Application February 29, 1956; Serial No. 568,573

6 Claims. (Cl. 78—17)

The present invention relates to a swaging apparatus and more particularly to a hydraulically operated swaging apparatus for wave guide tubing.

The use of wave guides for transmission in microwave systems having a plurality of frequency bands of wide range is possible if the dimensions, alignment and/or concentricity of the wave guides are held to very close tolerances.

In utilizing wave guides in such systems it is necessary to connect sections in the construction of a network of transmission towers or lines which may extend across a continent, to replace defective sections, and to insert at the proper location auxiliary equipment necessary for effective transmission or control. Further, as the wave guide lines may be filled with a suitable gas such as dry air or nitrogen to protect the interior from corrosion, or to minimize breakdowns at high voltage, it is necessary to have a sealed joint and for electrical reasons the joint must mate nearly perfectly all around the inner perimeter of the tubing. This presents the problem of providing suitable wave guide sections which will permit achievement of the requirements set forth above.

It has been the practice in the past to utilize tubular members to which a flange has been soldered, but this has resulted in a certain amount of distortion due to warpage from the soldering heat. Also, in instances where threads have been provided to join sections, it has been found that the threads weaken the tube, and further that it is very expensive to form threads of the required precision.

The present invention is an improvement of the method and apparatus for swaging flanges on tubular members as disclosed in the copending application Serial No. 469,489, filed on November 17, 1954, in the names of Theophile Corbeels and Robert N. Marshall, wherein tubular members are formed with a head portion on the extremity thereof by applying pressure to an end of the tubular member while securing the tubular member against lateral movement and while supporting the internal surfaces thereof.

It is an object of the present invention to provide a swaging apparatus in which hydraulically operated piston-cylinder assemblies are adapted to be actuated in a predetermined sequence in which the timing of the sequence is determined by the pressure within the system together with the provision of operating the assembly in a forward sequence or a reverse sequence depending upon the establishment of certain fluid and electrical circuits.

It is another object of the present invention to provide a hydraulic power transmission system particularly adapted for the automatic operation of the swaging machine which when started will operate automatically to cause the several fluid motors to operate in proper sequence or which may be stopped or reversed at will.

A further object of the present invention is to provide lubricating means which will automatically lubricate the moving parts of such a machine.

Another object of the invention is to provide a novel indexing means whereby a tube can be placed in the machine for performing a swaging or similar operation upon one end thereof and will be automatically positioned so that a predetermined length of the tube will extend beyond a clamping means.

A further object of the present invention is to provide a machine of the above nature in which the tube will be manually inserted into the machine, automatically positioned, and then clamped by a pair of cooperating chucking die members, all before the shaping and forming operations are commenced.

A still further object of the present invention is to provide a machine of the above nature in which a tube stopping member will be removed from the path of the forming tool before the latter engages the end of the tube.

Yet another object of the present invention is to provide a novel apparatus for automatically lubricating a mandrel and the tube only at such time as the mandrel is being inserted into the tube.

Another object of the invention is to provide a tube swaging machine with novel means for positioning and clamping the end of the tube to be swaged and hydraulic means associated therewith for actuating a plurality of fluid motors.

A further object of the present invention is to provide a tube swaging machine of the above character wherein the clamping means comprises inserts for releasably engaging segments of the clamp contacting the tube as the tube is removed from the clamps.

A still further object of the present invention is to provide a safety feature whereby the apparatus may be stopped or reversed in an emergency or at any desired time by pressing a stop or reverse button.

Other objects and features of the invention will be more readily understood from the following detailed description when read in conjunction with the accompanying drawings, in which:

Fig. 4 shows a fragmental cross-sectional view of the apparatus taken substantially on line 4—4 of Fig. 2;

Fig. 5 is a cross-sectional view of the apparatus taken substantially on line 5—5 of Fig. 1;

Fig. 6 is a cross-sectional view taken substantially on line 6—6 of Fig. 1;

Fig. 7 is a fragmental cross-sectional view of the apparatus taken substantially on line 7—7 of Fig. 4 except as it would appear if Fig. 4 where unsectioned instead of in cross-section;

Fig. 8 is a cross-sectional enlarged view of the apparatus taken substantially on line 8—8 of Fig. 4;

Fig. 9 is a fragmental enlarged view taken substantially on line 9—9 of Fig. 2;

Fig. 10 is a cross-sectional view of the apparatus taken substantially on line 10—10 of Fig. 9;

Fig. 11 is a fragmental cross-sectional view taken substantially on line 11—11 of Fig. 10;

Fig. 12 is a fragmental cross-sectional view taken substantially on line 12—12 of Fig. 10;

Fig. 13 is a diagram of the electrical circuits of the swaging apparatus;

Fig. 14 is a diagram of the hydraulic circuit of the swaging apparatus;

Fig. 15 is a fragmental top plan view of the tube positioning means;

Fig. 16 is an enlarged detailed fragmental cross-sectional view of the flange positioned on the tubular member which is secured in the clamping means prior to the swaging operation;

Fig. 17 is an enlarged detailed fragmental cross-sectional view similar to Fig. 16 after the tube has been swaged;

Fig. 18 is a fragmental top plan view of the end of the swaging apparatus which supports the end of the tubular member opposite the end which is being swaged;

Fig. 19 is a fragmental side elevation view of the end of the swaging apparatus as shown in Fig. 18, and Fig. 20 is a fragmental end view of the end of the swaging apparatus as shown in Fig. 18.

Figure 1:
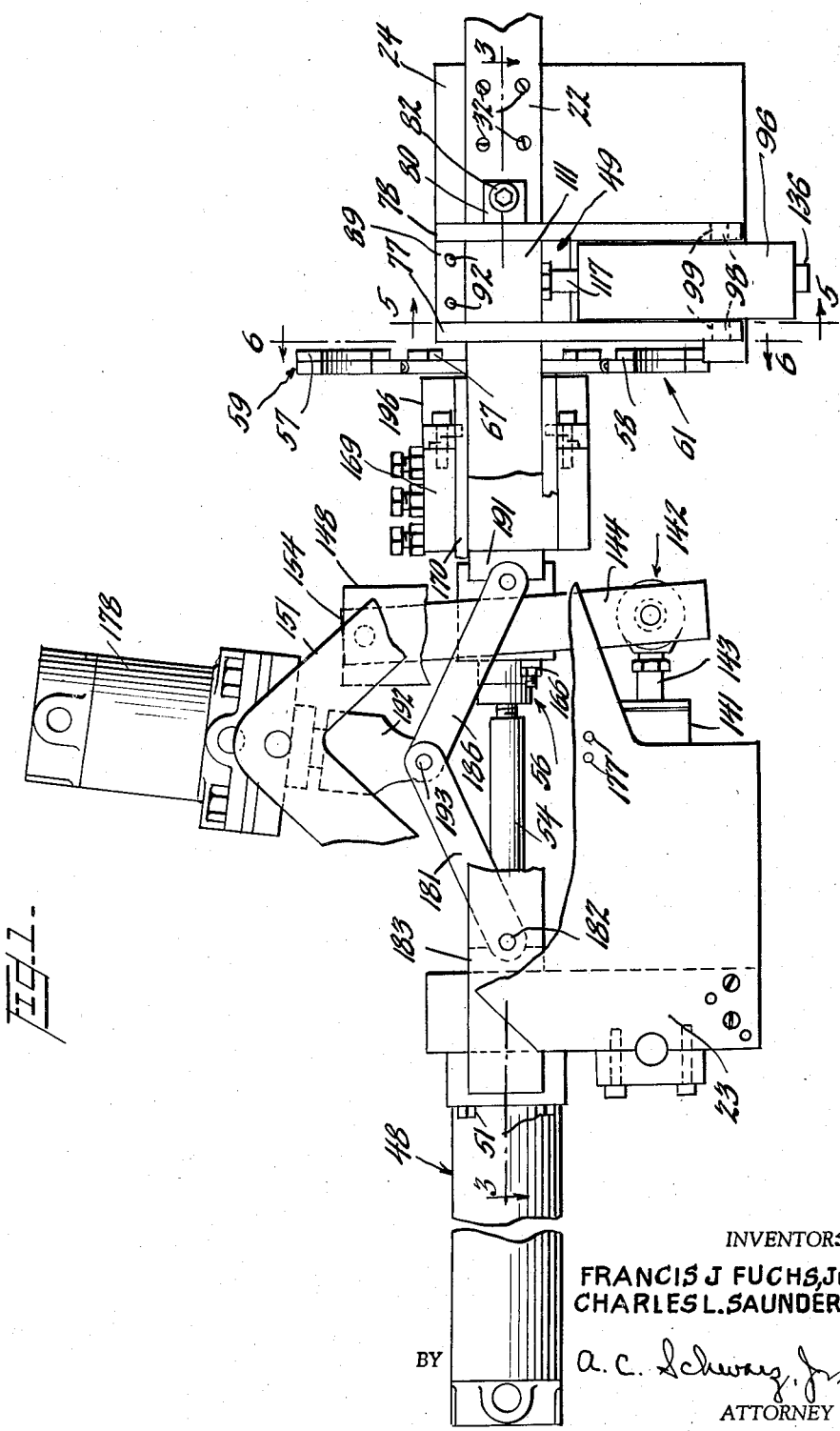
Fig. 1 shows a fragmental side elevation view of the swaging apparatus in the unoperated position.
Figure 2:
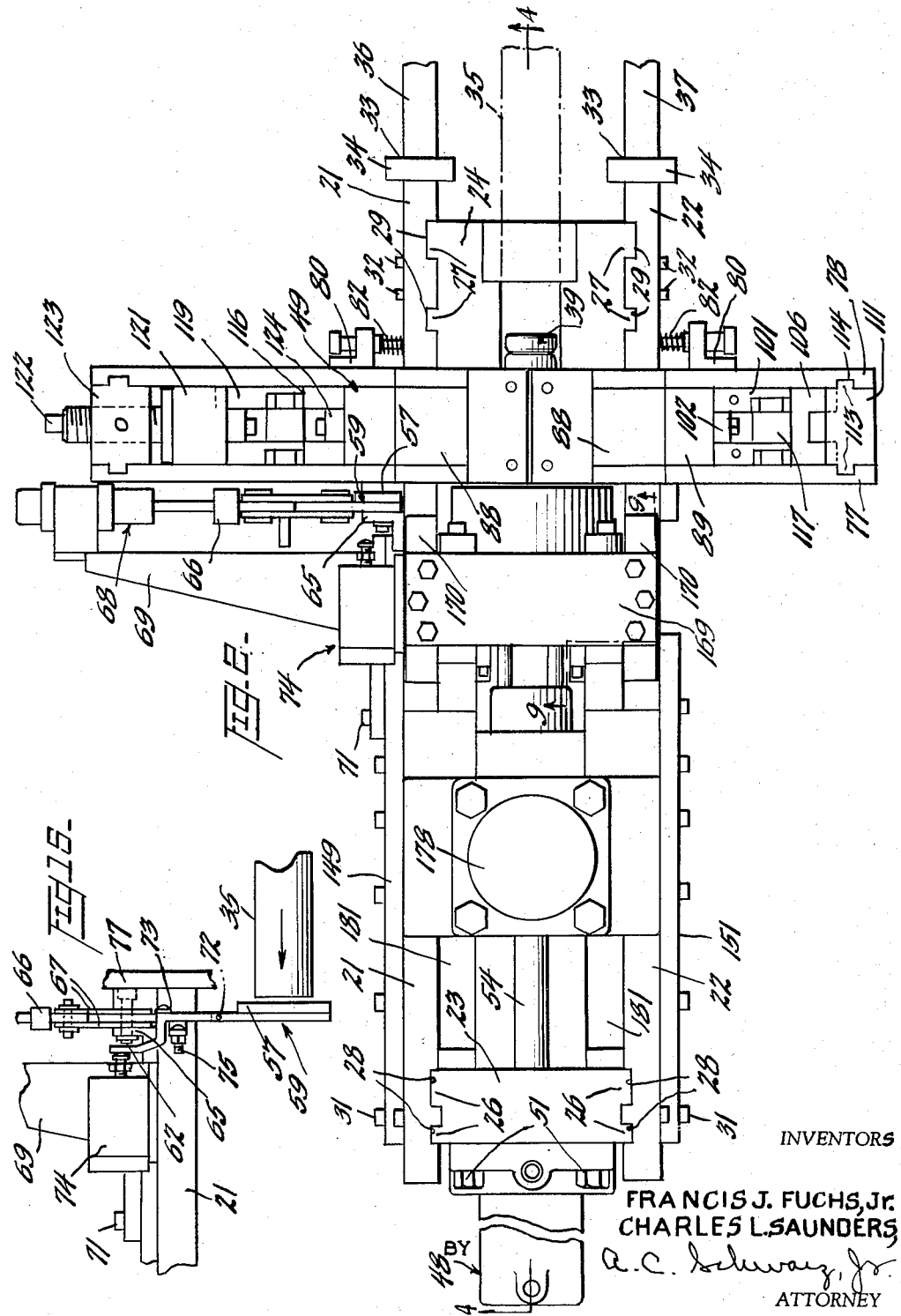
Fig. 2 shows a fragmental top plan view of the apparatus of Fig. 1 in the operated position.

Referring now to the drawings wherein like reference numerals designate similar elements throughout the several views and particularly Figs. 1 and 2 thereof, a swaging machine is shown comprising a framework comprised of two longitudinal tension rods 21 and 22 supported upon a base, not shown, by support members 23 and 24 therebetween and near opposing ends thereof. The rod members 21 and 22 must be of sufficient strength since the entire strain produced by the heading of tubular members 35 is absorbed by the tension rods 21 and 22. The relative movement of the supporting members 23 and 24 is prevented by projections 26 and 27 thereon, respectively, engaging slots 28 and 29 in the rod members 21 and 22 and also by bolt means 31 and 32. The block member 24 has a plurality of U-shaped cut-out portions for the work to rest in, one being larger than the other to facilitate placing a flange 138 on both ends of a shorter tubular member 35 than would otherwise be possible. The rod members 21 and 22 are provided with threaded ends 33—33 which project beyond the support member 24 and which have mounted thereon nuts 34—34 which secure additional rod members 36 and 37 thereto. The rod members 36 and 37 are supported at the opposing end by support means, designated generally by the numeral 40. The support means 40 consists of an upright member 63 secured to the end of each of the rods 36 and 37 by bolt means 70. The upright members 63—63 are braced by two crossed L-shaped members 64. Located between rods 36 and 37 is a hydraulically operated backstop member 38 to position the tubular member 35 and to prevent any longitudinal movement of the tubular member 35 during the insertion of a mandrel, designated generally by the numeral 39.

Figure 3:
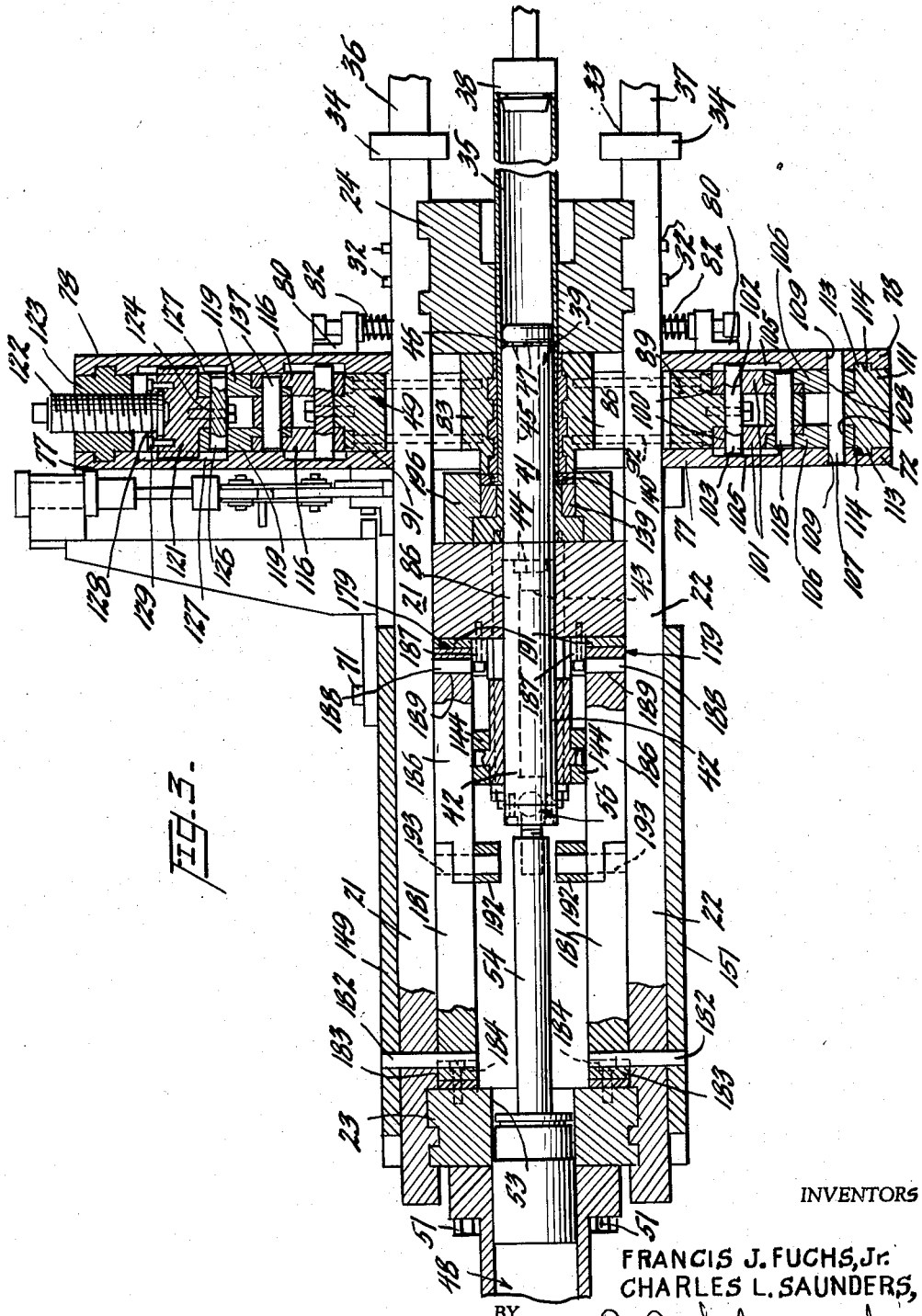
Fig. 3 shows a fragmental cross-sectional view taken substantially on line 3—3 of Fig. 1 except showing the apparatus in the operated position.

The mandrel 39, as indicated in Fig. 3, which may be constructed of polished steel of slightly larger dimensions than the normal inside dimension of the tubular member 35, has a rounded end section to avoid marking and scoring the inside surface of the tube 35. It has been found that by applying a lubricant to the mandrel 39, prior to the insertion thereof into the tube 35, that the mandrel 39 is more readily extracted and scoring of the inside surface of the tube 35 is avoided. The mandrel 39 comprises hollow cylindrical sections 41 and 42 secured to each other by male and female threaded end portions 43 and 44, respectively, and has a recess 46 around the periphery adjacent the rounded end thereof which communicates with a hollow bore 45 (Figs. 4, 5, and 9) by means of ports or radial outlets 47 so that a suitable lubricant may be delivered through the bore 45 and ports 47 to the inner surface of the tubular member 35. Force is applied to the mandrel 39 by a hydraulic piston cylinder assembly, designated generally by the numeral 48, to insert the mandrel 39 into the tube 35 a sufficient distance so that clamping pressure will not be applied on the rounded end portion and/or recess 46 by a clamping means, designated generally by the numeral 49, thereby avoiding the possibility of forming a mark on the inside surface of the tube 35 by the clamping pressure at the recess 46 or at the rounded end portion of the mandrel 39. The piston cylinder assembly 48 is secured to support member 23 by means of bolts 51. A piston 52 of the piston cylinder means 48 passes through an aperture 53 in the support means 23, and an integral rod member 54 is secured to one end of the mandrel 39 by a ball and socket coupling designated generally by the numeral 56.

Referring now to Figs. 2, 6, and 15, forward stop members 57 and 58 are normally in the open position shown in the solid lines, but during the positioning of the tubular member 35 and retraction of the mandrel 39, are in the position as shown in the dotted lines. The stop members 57 and 58 are two flat semicircular members secured to pivoted arm members, designated generally by numerals 59 and 61. The arms 59 and 61 are pivotally secured to the rod member 21 by pins 62—62 passing through apertures in the arms 59 and 61 and apertures in brackets 65—65 secured to the rod 21. The arm members 59 and 61 are actuated by the reciprocating motion of a block 66 connected thereto by links 67—67. The block 66 is actuated by a piston cylinder assembly designated generally by the numeral 68 secured to a bracket 69, which bracket 69 is secured to the rod 21 by bolts 71 (Fig. 2). A portion of the upper arm 59 is pivotal about a pin 72 and is held against excessive movement in one direction by an adjustable stop means 75 and biased in the other direction by a leaf spring 73. The pivotal portion of the arm 59 is used to control a valve, designated generally by the numeral 74 (Fig. 2) which in turn controls a fluid motor, designated generally by the numeral 76 (Figs. 14 and 18). The motor 76 in turn controls the backstop member 38 (Fig. 14) during the positioning of the tubular member 35 prior to the insertion of the mandrel 39 therein.

The fluid motor 76 which actuates the stop member 38 is longitudinally adjustably positioned centrally between the rods 36 and 37 by a cross member 50 slidable thereon and secured by pins 55 in apertures 60 in the rods 36 and 37.

The clamping means designated generally by the numeral 49 and more clearly illustrated in Figs. 3 and 5 comprises two spaced parallel plates 77 and 78, plate 78 being in juxtaposition with the support member 24. The working parts of the clamping means 49 are positioned between the parallel plates 77 and 78. The clamping means 49 is spring-mounted on a base member 79 by springs 81—81 and also is supported laterally by springs 82—82 (Fig. 2) being placed between brackets 80—80 secured to the clamping means 49 and the rod means 21 and 22. The base member 79 is secured to the support member 24 by suitable means. The clamping jaws, designated generally by the numeral 83, comprise a plurality of spring-mounted inserts 84 mounted in block members 86—86 having semicircular grooves 95 (Figs. 16 and 17) therein, the inserts 84 having threaded or serrated faces 87 thereon to contact the tubular member 35. The block members 86—86 are reciprocated between the rod members 21 and 22 by the use of members 88 straddling the rod members 21 and 22 and secured to block members 89 and 91 by bolt means 92, the block members 89 and 91 being actuated by linkages designated generally by the numerals 93 and 94 and by two identical piston cylinder means 96 and 97 actuated by a common hydraulic source, the piston cylinder means 96 and 97 being pivotally secured to and between the plates 77 and 78 by cylindrical projections 98 on the piston cylinder means 96 and 97 in apertures 99 in the plates 77 and 78 to facilitate necessary oscillation of the piston cylinder means 96 and 97 during the actuation of the clamping means 49. The linkage 93 comprises links 101—101 secured to the block 89, by the use of a member 102 having cylindrical projections 103—103 on opposing sides thereof which are positioned in apertures 100—100 (Figs. 3 and 5) in the links 101—101, the ends of the projections being slidable in grooves 105—105 in plates 77 and 78, and links 106—106 which are pivotally secured to the plates 77 and 78 by a pin 107 passing through apertures 108—108 in the links 106—106 and apertures 109 in the plates 77 and 78, the links 106—106 being held against lateral movement by a bearing member 111 which is secured to and between the plates 77 and 78 by bolt means 112 (Fig. 5) and reinforced by the use of ridges 113 on the member 111 projecting in slots 114 in the plates 77 and 78. Links 101—101 are secured to the piston cylinder rod member 117 and links 106—106 by the use of a pin 118 passing through apertures therein. Links 116—116 are similarly secured to member 91 as described in regard to links 101—101 being secured to member 89. Links 119—119 are secured to a slidable block 121 which is adjustable by the use of a screw 122 passing through the block 123 which is similarly secured between and to the plates 77 and 78 as member 111. The links 119—119 are secured to the block 121 by the use of a member 124 similar to member 102. The slidable member 121 has projections 126—126 thereon to fit in raceways or slots 127—127 in the plate members 77 and 78 and is secured to the member 122 by the use of a plate 128 and screw means 129. The links 116—116 and 119—119 are secured to each other and to a piston cylinder rod member 130 by a pin 137 passing through apertures therein. The block members 86—89 and 86—91, and connecting means therefor, are guided by an inverted T-shaped rail 131 (Fig. 4) secured thereto by screws 132, and are slidably mounted in a corresponding raceway 133 in a block 134 secured between plates 77 and 78. The block 134 supports the clamping means 49 on the base 79 by spring members 81—81 which are adjustable by the use of screws 136—136.

A flange 138 to be swaged on the tubular member 35 is positioned so that the cylindrical projections 140 extending from a flange pressure member 139 project through apertures in the flange. The flange 138 is held against the clamping means 49 by the flange pressure member 139 to which longitudinal force is applied by the hydraulic cylinder piston means 141 pivotally secured to the member 23 through a linkage designated generally by the numeral 142 and more specifically illustrated in Figs. 7 and 8 wherein the rod member 143 of the piston cylinder assembly 141 is pivotally secured centrally between parallel plate members 144—144 by a pin 146 and by the use of spacers 147—147 thereon. The parallel plates 144—144 are pivotally and slidably mounted in L-shaped support members 148—148 which are secured to and between plate members 149 and 151 and secured to and upon the rod members 21 and 22 by keys 152—152 in keyways 153—153 in the supports 148—148 and the rods 21 and 22. The plate members 144—144 are secured at the upper end (Fig. 4) thereof to block members 154—154 having bearing faces 156 secured thereto which are slidable in the raceways 157—157 of the support member 148—148 by the use of a pin 158. The plate members 144—144 are spaced by the use of members 159 and 161 in opposing ends thereof. The linkage 142 is pivotally secured to a block member 162 by cylindrical projections 163—163 on opposing sides thereof and apertures 164—164 in the plates 144—144, the block member 162 being slidably mounted on the mandrel 39 and secured to the pressure member 139 by a plurality of plunger rods 166 secured in the member 139 and slidably mounted in a plurality of apertures 176 (Fig. 9) in a heading punch, designated generally by the numeral 168, and in apertures in an abutting member, designated generally by the numeral 169, which is slidably mounted on the mandrel 39 and mounted on bearing members 170—170 (Figs. 1 and 10) which reciprocate on rod members 21 and 22. The reverse movement of the pressure member 139 is limited by the use of an adjustable screw 171 mounted in member 172 (Fig. 4) which is secured to and between the plate members 144 by the use of screws 173, the adjustable screw 171 abutting another screw member 174 in a member 176 secured to and between plate members 149 and 151 by screws 177 (Fig. 1) therein.

The hollow heading punch 168, slidably mounted on the mandrel 39, is actuated by a piston cylinder assembly 178, which is pivotally secured to and between the plate members 149 and 151, by the application of force to intermediate members, designated generally by the numeral 179 (Figs. 1 and 3), through a linkage comprising links 181—181 which are pivotally secured to rod members 21 and 22 and plate members 149 and 151 by the use of pins 182—182. The links 181—181 abut and oscillate on end bearing members 183—183 secured to the support member 23 by the use of screws 184 and links 186—186, which are pivotally secured to the abutting member 169 by members 187—187 having cylindrical projections 188—188 on one side thereof passing through apertures 189—189 in the links 186—186, which links oscillate in bearing members 191 which are secured to the abutting member 169. The links 181—181 and 186—186 are pivotally secured to each other and to a member 192 by pins 193, the member 192 being screw-threaded to the rod member 194 of actuating means 178. The abutting member 169, which is actuated by the piston cylinder means 178, also moves a flange retainer 196 to the proper position to prevent expansion of the flange 138 when longitudinal force is applied by the heading punch 168 to an end of the tubular member 35 to head or swage a portion thereof. The flange retainer 196 is secured to the abutting member 169 by the use of bolts 175 and members 180, being in indentations 185 in the flange retainer, to facilitate the retraction of the flange retainer 196.

In the sequence of operations of the swaging apparatus, the fluid in the hydraulic system is pumped continuously from a supply tank 201 by a fluid pump 202 which is driven by an electric motor 203 through a line having a pressure relief valve 204 to return the fluid to the tank 201. A portion of the fluid is directed from the pump 202 through port 206 in the slide of a pilot valve 207, which slide is normally held to the right by the spring 208, to a hydraulic cylinder 209 which holds the slide of a four-way valve 211 to the right to allow the remaining fluid to pass through port 212 of the valve 211 and return to the tank 201. Any fluid which may be in the cylinder 213 will be exhausted through port 214 to the tank 201. The tube 35 is placed manually in the apparatus on a cross member 215, against the backstop 38 on one end of the tube 35, and on the block member 24 and against normally closed forward stop members 57 and 58 at the opposing end of the tube. Start button 216 (Fig. 13) is actuated to connect the voltage source 217 to the holding coil 218 to energize the same and thus simultaneously close the spring biased relay swingers 219, 221, 222, 223, and 224 mechanically connected to and operated thereby. It should be noted that the start button 216 must be held down until the mandrel 39 has moved to the right, until subsequent operations take place as disclosed below, a sufficient distance to close a switch 226 so that the holding coil 218 will be energized by the 110-volt source 217 through the relay swinger 219, the switch 226, and the normally closed stop button 227. The closing of the relay swinger 223 will connect the power source 217 to solenoid 228 to energize the same to actuate lubricating means (not shown) which automatically lubricates the moving parts of the swaging apparatus each time the start button 216 is pressed. The actuation of the relay swinger 224 will connect the power source 217 to the solenoid 229 to energize the same, which in turn actuates the slide of the pilot valve 207 (Fig. 14) to the left against a normal actuation to the right by the spring 208. The fluid from the pump 202 will pass through port 231 to the hydraulic cylinder 213 to move the slide member of the four-way valve 211 to the left to allow fluid to pass from the pump 202 through port 232 to the pilot valve 233 and four-way valve 234. The exhaust fluid from the cylinder 209 will be directed through the port 236 and thus to the tank 201. The slide of the pilot valve 233 is initially to the right since the switch 237 is initially closed to cause the power source 217 to be supplied to a solenoid 238 through relay swinger 221 at the time the swinger 221 was closed by the holding coil 218. Any fluid which may have been in the hydraulic cylinder 213 will be exhausted through port 214 to the tank 201. A portion of the fluid will be directed through port 239 to the hydraulic cylinder 241 which holds the slide member of the valve 234 to the left to direct the remaining fluid through port 242 to the forward sequence pressure valves 243, 244, 246, and 247 and valve 74. Any fluid which may have been in cylinder 248 will be directed through port 249 to the tank 201. The pressure sequence valves 243, 244, 246, and 247 are set at such values that they will not be actuated until the fluid in the hydraulic system has attained a certain pressure above that which is necessary to actuate the backstop member 38. Therefore, the fluid pressure directed to valve 74 will pass through port 251 and thus to the head end of cylinder 76 to actuate the tube 35 to the left against the backstop members 57 and 58, to move the slide of the valve 74 to the left against the normal actuation to the right by the spring 252 and to close the port 251 with the slide of the valve 74. Any fluid escaping from the rod end of cylinder 76 will pass through ports 253 and 254 to the tank 201. Any overrun of the slide will allow the fluid to pass through port 253 to the rod end of cylinder 76 to move the tube to the right and thus accurately position the tube in a predetermined position. The projections around the periphery of the slide of the valve 74 which close ports 251 and 253 are the same width as the ports 251 and 253, and thus cause accurate positioning of the tube 35. Any fluid to the left or right of the slide of the tube 35 will be exhausted through ports 256 and 257, respectively, to tank 201. Upon accurate positioning of the tube 35 in a predetermined location, the slide of the valve 74 will be positioned so as to prevent passage of the fluid through ports 251 and 253. The start button is released at this time, thus deenergizing solenoid 229 allowing the fluid to pass to the tank 201 to idle the apparatus to permit manual placement of a flange 138 on projections 140 of the flange pressure member 139 (Fig. 11). When the flange is properly placed in the apparatus the start button is again actuated and since the ports 251 and 253 in the valve 74 are closed, as discussed above, pressure will be built up in lines to actuate the valve 243 to allow fluid to pass to piston 48 to insert the mandrel 39 into the tube 35. The movement of the mandrel will actuate the switch 226 (Figs. 13 and 14) so that the voltage source 217 will continue to energize the holding coil 218 after the start button 216 has been released. The movement of the mandrel will simultaneously open switch 237 to deenergize the solenoid 238 which will permit the slide of valve 233 to be actuated by solenoid 258 to reverse the apparatus during the cycle or at the end of the forward portion of the cycle. The fluid pressure which actuates the fluid motor 48 associated with the mandrel 39 will also operate a high pressure switch 259 and the fluid escaping from the opposite end of the fluid motor 48 will actuate a low pressure switch 261, which switches 261 and 259 (Figs. 13 and 14) are connected in series to close a circuit containing the closed relay swinger 222 and the voltage source 217 to energize a solenoid 262 to operate a pilot valve (not shown) which in turn controls the three-way valve (not shown) which directs lubricating fluid from an independent source (not shown) to the mandrel 39 to lubricate the same during the insertion thereof into the tube 35. Stop switch 227 may be actuated at any desired time to completely stop the movement of the swaging apparatus. The actuation of the stop button 227 deenergizes the solenoid 229 and thus allows the slide of valve 207 to be returned to the right by the spring 208 and return the fluid from the pump 202 to the tank 201, thus idling the apparatus. At such time as the mandrel 39 has completed the forward motion, pressure is built up in the hydraulic circuit to operate a second pressure sequence valve 244 to allow fluid to be directed therethrough to the clamping cylinders 96 and 97 to clamp the tube 35 in the swaging apparatus. At the completion of the clamping operation, the fluid pressure in the hydraulic system is further increased to operate a third sequence valve 246 which allows the fluid to pass therethrough to a remotely-controlled check valve 263, through a pressure reducing valve 264 to the flange pressure member cylinder 141 to hold the flange 138 on the tube 35 against the clamping means 49 and to simultaneously direct fluid to the forward stop cylinder 68 to retract stop members 57 and 58. Since the cylinder 68 for the stop members will actuate at a lower pressure than the flange pressure member cylinder 141, the stop members 57 and 58 will be retracted prior to any movement of the flange pressure member 139. At the completion of this operation, the fluid pressure in the hydraulic system is further increased to actuate a fourth sequence valve 247 to direct the fluid pressure to the heading cylinder 178 to actuate the heading punch 168 and swage the tube 35 to secure the flange 138 on the end of the tube 35. Cylinder 178 simultaneously moves the flange retainer 196 to the proper position to prevent expansion of the flange 138. The heading punch 168 travels a predetermined distance and actuates normally open spring-actuated switch 266 which connects the voltage source 217 to the solenoid 258, which actuates the slide member of the valve 233 to the left to cause a portion of the fluid coming from the four-way valve 211 to be directed through port 267 to the hydraulic cylinder 248 to move the slide of the valve 234 to the right to allow the remaining fluid from the four-way valve 211 to pass through the port 268 of the valve 234, to reverse pressure sequence valves 269, 271, 272, and 273, and through the check valve 274, the normally open remotely-controlled valve 276, the pressure reducer 264 to the flange pressure member cylinder 141 to apply force to the flange 138 during a portion of the reversing cycle. Any fluid in the hydraulic cylinder 241 will be exhausted through port 277 of the pilot valve 233 to the tank 201. A reverse cycle may be started at any desired time by the application of force on the reverse button 278 which is in parallel with the main limit switch 266 (Fig. 13) associated with the heading punch 168, which switch 266 and button 278 are in series with the reverse solenoid 258 connected to the voltage source 217. The fluid pressure builds up in the hydraulic system to actuate the first reverse sequence valve 269 which in turn reverses the heading cylinder 178 to remove the slidable heading punch 168 away from the flanged tube 35, and thus permit the switch 266 to be opened by the spring return to deenergize solenoid 258 which will permit solenoid 238 to move the slide of valve 233 at any desired time. At the completion of the reversal of the heading cylinder 178, the fluid pressure is increased to operate a second sequence valve 271 to apply pressure through a pilot line to open the remotely-controlled check valve 263 and at the same time close the normally open spring-biased remote valve 276 to prevent the application of pressure on the head end of the flange pressure cylinder 141 and permit the fluid from the head end of cylinder 141 to escape through the check valve 263 and the check valve 284, in parallel with valve 246, to the tank 201. Pressure is also directed to the rod end of the pressure pad cylinder 141 to retract the same. At the completion of this operation, the movement of which is limited by the adjustable screw 171 (Fig. 4) abutting the screw member 174, pressure in the hydraulic system is further increased to actuate a third sequence valve 272 to apply fluid pressure therethrough to a fluid booster 279 to reverse the clamping cylinders 96 and 97 to remove the clamps 49 from the tube 35 and simultaneously direct pressure to the head end of cylinder 68 to close the forward stops 57 and 58. At the completion of this operation, the fluid pressure in the hydraulic system is further increased to operate the fourth sequence valve 273 to direct fluid pressure therethrough to the rod end of the mandrel cylinder 48 to remove the mandrel 39 from the tube 35 and at the same time apply pressure through the check valve 281 to the rod end of the backstop cylinder 76 to retract the backstop member 38 to allow removal of the tube 35. Any fluid which may be in the head end of cylinder 76 will be directed through ports 251 and 256 in the valve 74 and thus to the tank 201, since the slide of the valve 74 will be actuated to the left by the application of force on the stop member 57 by the tube 35 due to the retraction of the mandrel 39. As the mandrel 39 is retracted the limit switch 226 is opened to disconnect the voltage source 217 from the holding coil 218 to stop the apparatus and at the same time the movement of the mandrel closes switch 237 to permit energization of the solenoid 238 for additional operations. It should be noted that any fluid which may be in the portion of the hydraulic circuit which is used in the forward and reverse cycles, will be returned to the tank 201 through the various check valves 284 in parallel with the various forward and reverse sequence valves and through ports 282 and 283 in the valve 234, respectively.

It should be noted that the flange pressure member 139 is necessarily held against the flange 138 during the removal of the heading punch 168 to prevent the flange 138 from being moved with respect to the swaged tube 35 by the flange retainer 196, which is simultaneously retracted with heading punch 168, due to the high degree of frictional force between the flange 138 and the flange retainer 196 resulting from the expansive forces set up in the flange 138 during the swaging of the tube 35.

Since the inside diameter of the flange pressure member 139 is the same size as the outside diameter of the swaged portion of the tube 35, the flange pressure member 139 would not bear against any portion of the tube 35. Therefore, the forward stop members 57 and 58 are placed between the flanged pressure member 139 and the flanged tube 35 during the removal of the mandrel 39 from the tube 35 to prevent any tendency to move the flange with respect to the tube 35. The reversal of the flange pressure member 139 is limited by the adjustable screw 171 so that the flange pressure member 139 will serve as a stop for the forward stops 57 and 58 to bear against to hold the tube 35 against longitudinal movement during the removal of the mandrel from the tube 35.

In the swaging operation it is desirable to have the speed of plastic flow exceed the rate of work-hardening in the metal to facilitate the formation of a headed portion on the tube and prevent the possibility of distortion in the tube due to unnecessary force being applied to overcome the work-hardening of the metal.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A tube swaging apparatus comprising a fluid pump, means to actuate said pump, a plurality of valves to direct fluid pressure from said pump to a plurality of fluid distribution lines, forward sequence valves connected in said distribution lines to control forward operation of said apparatus, a servomechanism, a feed piston cylinder assembly controlled by said servomechanism to position a tube at a predetermined location, a stop means actuated by the tube to control said servomechanism, means to actuate said stop means, clamping means to clamp the tube, means to actuate said clamping means, a pressure booster associated with said clamping means to increase the fluid pressure on said clamping means, a mandrel to support the inside of the tube, means to actuate said mandrel, a flange pressure member to position a flange on the tube, means to actuate said flange pressure member, a heading punch to upset the end of the tube to secure the flange to the tube, means to actuate said punch, a limit switch associated with and controlled by travel of said punch to reverse the cycle of operation of the apparatus, a mandrel lubricating means to lubricate said mandrel, a plurality of pressure switches connected to one of said distribution lines operating said mandrel to actuate said mandrel lubricating means, and a plurality of reverse sequence valves connected in said distribution lines to control the reverse operation of the apparatus, said servomechanism, said feed piston cylinder assembly, said means to actuate said stop member, said means to actuate said clamping means, said means to actuate said mandrel, said means to actuate said flange pressure member and said means to actuate said punch all being connected to said fluid pump by said plurality of fluid distribution lines and actuated in a predetermined sequence by the fluid being pumped therethrough.

2. A tube swaging apparatus comprising a fluid pump, means to actuate said pump, a plurality of valves to direct fluid pressure from said pump to a plurality of fluid distribution lines, forward sequence valves connected in said distribution lines to control forward operation of said apparatus, a servomechanism, a feed piston cylinder assembly controlled by said servomechanism to position a tube at a predetermined location, a stop means actuated by the tube to control said servomechanism, means to actuate said stop means, clamping means to clamp the tube, means to actuate said clamping means, a pressure booster associated with said clamping means to increase the fluid pressure on said clamping means, a mandrel to support the inside of the tube, means to actuate said mandrel, a flange pressure member to position a flange on the tube, means to actuate said flange pressure member, a heading punch to upset the end of the tube to secure the flange to the tube, means to actuate said punch, a limit switch associated with and controlled by travel of said punch to reverse the cycle of operation of the apparatus, a mandrel lubricating means to lubricate said mandrel, a plurality of pressure switches connected to one of said distribution lines operating said mandrel to actuate said mandrel lubricating means, a plurality of reverse sequence valves connected in said distribution lines to control the reverse operation of the apparatus, said servomechanism, said feed piston cylinder assembly, said means to actuate said stop member, said means to actuate said clamping means, said means to actuate said mandrel, said means to actuate said flange pressure member and said means to actuate said punch all being connected to said fluid pump by said plurality of fluid distribution lines and actuated in a predetermined sequence by the fluid being pumped therethrough, and means to apply pressure to the flange pressure member during a predetermined portion of the reverse cycle.

3. A tube swaging apparatus comprising a fluid pump, means to actuate said pump, a plurality of valves to direct fluid pressure from said pump to a plurality of fluid distribution lines, forward sequence valves connected in said distribution lines to control forward operation of said apparatus, a servomechanism, a feed piston cylinder assembly controlled by said servomechanism to position a tube at a predetermined location, a stop means actuated by the tube to control said servomechanism, means to actuate said stop means, clamping means to clamp the tube, means to actuate said clamping means, a pressure booster associated with said clamping means to increase the fluid pressure on said clamping means, a mandrel to support the inside of the tube, means to actuate said mandrel, a flange pressure member to position a flange on the tube, means to actuate said flange pressure member, a heading punch to upset the end of the tube to secure the flange to the tube, means to actuate said punch, a limit switch associated with and controlled by travel of said punch to reverse the cycle of operation of the apparatus, a mandrel lubricating means to lubricate said mandrel, a plurality of pressure switches connected to one of said distribution lines operating said mandrel to actuate said mandrel lubricating means, a plurality of reverse sequence valves connected in said distribution lines to control the reverse operation of the apparatus, said servomechanism, said feed piston cylinder assembly, said means to actuate said stop member, said means to actuate said clamping means, said means to actuate said mandrel, said means to actuate said flange pressure member and said means to actuate said punch all being connected to said fluid pump by said plurality of fluid distribution lines and actuated in a predetermined sequence by the fluid being pumped therethrough, means to apply pressure to the flange pressure member a predetermined portion of the reverse cycle, and means to remove the pressure on the flange pressure member at a predetermined time during the reverse cycle.

4. A tube swaging apparatus comprising a fluid pump, means to actuate said pump, a plurality of valves to direct fluid pressure from said pump to a plurality of fluid distribution lines, forward sequence valves connected in said distribution lines to control forward operation of said apparatus, a servomechanism, a feed piston cylinder assembly controlled by said servomechanism to position a tube at a predetermined location, a stop means actuated by the tube to control said servomechanism, means to actuate said stop means, clamping means to clamp the tube, means to actuate said clamping means, a pressure booster associated with said clamping means to increase the fluid pressure on said clamping means, a mandrel to support the inside of the tube, means to actuate said mandrel, a flange pressure member to position a flange on the tube, means to actuate said flange pressure member, a heading punch to upset the end of the tube to secure the flange to the tube, means to actuate said punch, a limit switch associated with and controlled by travel of said punch to reverse the cycle of operation of the apparatus, a mandrel lubricating means to lubricate said mandrel, a plurality of pressure switches connected to one of said distribution lines operating said mandrel to actuate said mandrel lubricating means, a plurality of reverse sequence valves connected in said distribution lines to control the reverse operation of the apparatus, said servomechanism, said feed piston cylinder assembly, said means to actuate said stop member, said means to actuate said clamping means, said means to actuate said mandrel, said means to actuate said flange pressure member and said means to actuate said punch all being connected to said fluid pump by said plurality of fluid distribution lines and actuated in a predetermined sequence by the fluid being pumped therethrough, a pressure reducer valve in one of said distribution lines to control pressure applied to the flange pressure member, a remotely controlled check valve in one of said distribution lines, a remotely controlled valve in one of said distribution lines, and means to close the remotely controlled valve and open the remotely controlled check valve to prevent pressure from being applied to the head end of the flange pressure member and permit drainage of the fluid in the same through said remotely controlled check valve to permit the flange pressure member to be retracted.

5. A heading apparatus for tubular members comprising a mandrel, a hollow punch slidably mounted on said mandrel, a bifurcated block member straddling said mandrel, pins positioned in apertures in the furcations of said block member, a connecting member secured to said block member, a pivotally mounted fluid motor actuating said connecting member, a plurality of links pivotally secured to said bifurcated member by said pins, a stationary bearing, a movable bearing attached to said hollow punch, a group of said links having the ends thereof opposite the ends secured to said pins oscillating in said stationary bearing, and the remaining links having the ends opposite the ends secured to said pins oscillating in said movable bearing whereby upon actuation of said fluid motor said hollow punch is moved along said mandrel and upsets the end of a tubular member.

6. Apparatus for securing a flange to a tubular member comprising a hollow mandrel having apertures adjacent the end thereof, means to lubricate said mandrel by applying a lubricant through the apertures therein, a fluid motor to insert said mandrel into the tubular member, a plurality of reciprocating clamping members, a plurality of pivotally mounted fluid motors to actuate said clamping members to hold the tubular member against longitudinal movement, a flange positioned about the tubular member adjacent one end thereof, a fluid motor to move the tubular member to a predetermined position, a servomechanism to control the actuation of said last-mentioned fluid motor, a pivotally mounted stop member engaging the end of the tubular member and actuated thereby, to actuate said servomechanism, a pivotally mounted fluid motor, a link pivotally secured at one end thereof to said last-mentioned fluid motor and pivotally and slidably secured at the opposing end thereof, means movable in a straight line by said link to urge the flange against said clamping members to prevent longitudinal movement of the flange, means to prevent lateral movement of the flange, a hollow heading punch slidably mounted on said mandrel to apply force to the end of the tubular member to upset an end thereof, a bifurcated block member, a pivotally mounted fluid motor having a piston rod, said last-mentioned fluid motor connected to said heading punch and said last-mentioned means by the use of a plurality of links pivotally secured to said bifurcated member attached to said piston rod of said last-mentioned fluid motor, a stationary bearing, and a plurality of links secured to said stationary bearing and to said bifurcated member to control the pivoting of said last-mentioned motor during the actuation thereof.

References Cited in the file of this patent

UNITED STATES PATENTS

| | | |
|---|---|---|
| 469,784 | Hall | Mar. 1, 1892 |
| 1,193,078 | Scott | Aug. 1, 1916 |
| 1,433,880 | Fancher | Oct. 31, 1922 |
| 1,457,579 | Kranz | June 5, 1923 |
| 1,677,874 | Smith | July 17, 1928 |
| 1,804,003 | Fantz | May 5, 1931 |
| 1,955,119 | Fantz | Apr. 17, 1934 |
| 1,997,997 | Diescher | Apr. 16, 1935 |
| 2,027,406 | Spatta | Jan. 14, 1936 |
| 2,212,688 | Jones | Aug. 27, 1940 |
| 2,341,602 | Dewey | Feb. 15, 1944 |
| 2,345,207 | Mansfield | Mar. 28, 1944 |
| 2,438,999 | Hartley et al. | Apr. 6, 1948 |
| 2,515,841 | Stuart | July 18, 1950 |
| 2,618,842 | Gridley | Nov. 25, 1952 |